T. B. COURSEY.
Corn Crusher.
No. 24,198.
Patented May 31, 1859.
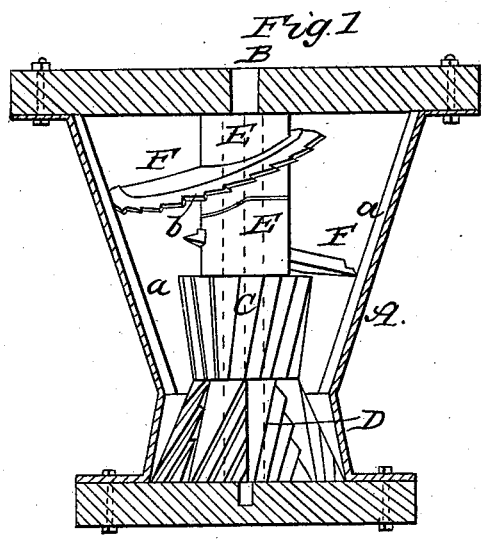
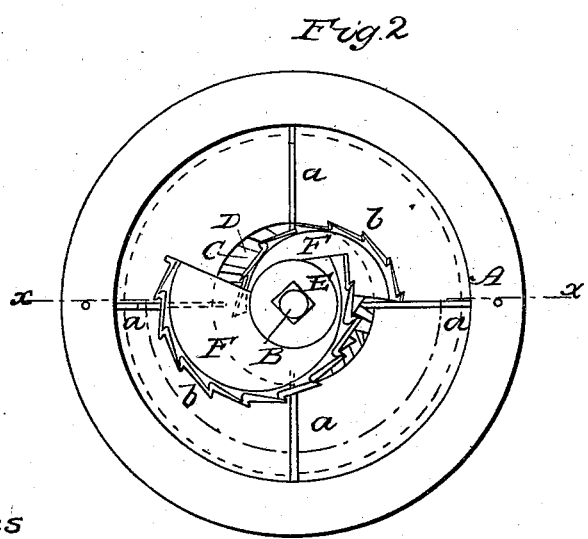

UNITED STATES PATENT OFFICE.

T. B. COURSEY, OF FREDERICA, DELAWARE.

CORN-CRUSHER.

Specification of Letters Patent No. 24,198, dated May 31, 1859.

*To all whom it may concern:*

Be it known that I, T. B. COURSEY, of Frederica, in the county of Kent and State of Delaware, have invented a new and useful Improvement in Corn-Crushers; and I do hereby declare that the following is a full, clear, and exact description of the same, reference being had to the annexed drawings, making a part of this specification, in which—

Figure 1, is a vertical section of my invention, taken in the line $x$, $x$, Fig. 2. Fig. 2, is a plan or top view of ditto.

Similar letters of reference indicate corresponding parts in the two figures.

This invention consists in attaching to the shaft of an ordinary corn or cob crusher, one or more serrated flanches, arranged substantially as hereinafter fully shown and described, so that the flanches or saws will perform the double function of crushers and feeders, first cutting or crushing the ears of corn and then crowding or pressing them down between the conical crushers and shell to be still further reduced or crushed.

To enable those skilled in the art to fully understand and construct my invention I will proceed to describe it.

A, represents the shell of a crusher which is of bi-conical form and provided wholly or partially at its inner side or surface with corrugations, teeth, or projections $a$, to form a roughened surface. B, is a shaft which is fitted vertically and centrally within the shell A, and has two conical crusher heads C, D, placed on it, the upper head C, being inverted corresponding to the position of the upper portion of the shell A, the lower head being in an upright position corresponding to the lower part of the shell.

The parts above described are of usual construction and therefore do not require a minute description. On the upper part of the shaft B, two sockets or collars E, E, are placed, and to each socket or collar, a sector plate or flanch F, is secured. These flanches may be described as having peripheries comprising about two thirds of a circle, the peripheries being serrated, or provided with teeth $b$, similar to saw teeth. The flanches F, are placed on the sockets or collars E, E, in inclined positions, the flanch on one socket or collar being in a reverse position to the other as shown clearly in Fig. 1, and the flanches are also placed eccentrically on their sockets or collars, the flanches also in this respect being in reverse positions, as shown clearly in both drawings. The shaft B, is rotated in the direction indicated by the arrows. From the above description of parts it will be seen that as the shaft B, rotates, the ears of corn will be crushed or cut by the teeth $b$, of the flanches F, F, the eccentric position of the flanches producing such result, and it will also be seen that the oblique position of the flanches force down the crushed ears through the crusher, the action of the flanches in this respect being like a screw.

The double functions performed by the flanches F, F, expedites very considerably the operation of the crusher, as the teeth $b$, of the flanches crush or cut the ears of corn with facility, and the flanches force the crushed ears down so as to be still further and expeditiously reduced by the heads C, D, the latter operation being performed under pressure produced by the flanches F, F.

I do not claim the shell A, nor the crushing heads C, D, for they have been previously used; but, I do claim as new and desire to secure by Letters Patent, The employment or use of the serrated flanches F, F, placed obliquely and eccentrically, on the shaft B, in combination with the crushing heads C, D, and shell A, substantially as and for the purpose set forth.

T. B. COURSEY.

Witnesses:
 I. H. BOONE,
 I. B. ANDERSON.